US010997459B2

(12) United States Patent
Koval et al.

(10) Patent No.: US 10,997,459 B2
(45) Date of Patent: May 4, 2021

(54) VIDEO CONTENT INDEXING AND SEARCHING

(71) Applicant: Webkontrol, Inc., New York, NY (US)

(72) Inventors: Pavel Koval, Moscow (RU); Olga Valigourskaia, Moscow (RU)

(73) Assignee: Webkontrol, Inc., New York, NY (US)

( * ) Notice: Subject to any disclaimer, the term of this patent is extended or adjusted under 35 U.S.C. 154(b) by 0 days.

(21) Appl. No.: 16/420,977

(22) Filed: May 23, 2019

(65) Prior Publication Data
US 2020/0372292 A1 Nov. 26, 2020

(51) Int. Cl.
| G06K 9/62 | (2006.01) |
| G06F 16/71 | (2019.01) |
| G06F 16/735 | (2019.01) |
| G06K 9/46 | (2006.01) |
| G06K 9/38 | (2006.01) |
| G06K 9/00 | (2006.01) |
| G06K 9/40 | (2006.01) |
| G06N 3/04 | (2006.01) |
| G06N 3/08 | (2006.01) |

(52) U.S. Cl.
CPC .......... *G06K 9/6215* (2013.01); *G06F 16/71* (2019.01); *G06F 16/735* (2019.01); *G06K 9/00718* (2013.01); *G06K 9/00744* (2013.01); *G06K 9/00765* (2013.01); *G06K 9/38* (2013.01); *G06K 9/40* (2013.01); *G06K 9/4652* (2013.01); *G06K 9/4676* (2013.01); *G06K 9/6212* (2013.01); *G06K 9/6221* (2013.01); *G06K 9/6232* (2013.01); *G06N 3/04* (2013.01); *G06N 3/08* (2013.01)

(58) Field of Classification Search
None
See application file for complete search history.

(56) References Cited

U.S. PATENT DOCUMENTS

| 2001/0048753 A1* | 12/2001 | Lee | G06T 7/155 |
| | | | 382/103 |
| 2002/0069218 A1* | 6/2002 | Sull | G11B 27/28 |
| | | | 715/202 |
| 2008/0313140 A1* | 12/2008 | Pereira | G06F 16/7837 |
| 2009/0052784 A1* | 2/2009 | Covell | G06F 16/783 |
| | | | 382/209 |

(Continued)

OTHER PUBLICATIONS

Jun. 26, 2020—U.S. Office Action—U.S. Appl. No. 16/880,391 (pp. 1-20).

*Primary Examiner* — Delomia L Gilliard
(74) *Attorney, Agent, or Firm* — Banner & Witcoff, Ltd.

(57) ABSTRACT

A method of indexing and searching for video content is provided. For each frame of a first plurality of frames, a first global feature and a first plurality of local features may be identified. The first plurality of local features may be clustered around a first plurality of cluster centers. The first plurality of local features may be converted into a first plurality of binary signatures. An index that maps the first plurality of cluster centers and the first plurality of binary signatures to the first plurality of frames may be generated. A search request associated with a second video may be received and its direct and indirect features may be identified. The identified features of the second video may be compared against the index and a candidate video may be selected as a result of the search request.

20 Claims, 4 Drawing Sheets

(56) References Cited

U.S. PATENT DOCUMENTS

| | | | |
|---|---|---|---|
| 2009/0319672 A1* | 12/2009 | Reisman | H04N 21/482 709/227 |
| 2010/0061587 A1 | 3/2010 | Gupta et al. | |
| 2010/0306193 A1* | 12/2010 | Pereira | G06F 16/783 707/728 |
| 2011/0122255 A1* | 5/2011 | Haritaoglu | G06F 16/7834 348/180 |
| 2011/0274361 A1* | 11/2011 | Bovik | G06K 9/00664 382/224 |
| 2012/0131010 A1* | 5/2012 | Wang | G06F 16/7864 707/743 |
| 2013/0114900 A1* | 5/2013 | Vedantham | G06K 9/00536 382/182 |
| 2013/0170541 A1* | 7/2013 | Pace | H04N 19/149 375/240.02 |
| 2015/0124874 A1* | 5/2015 | Pace | H04N 19/167 375/240.08 |
| 2016/0034452 A1* | 2/2016 | Ramanathan | G06F 16/9014 707/747 |
| 2016/0259815 A1* | 9/2016 | Song | G06K 9/4676 |
| 2016/0259816 A1* | 9/2016 | Song | G06K 9/6255 |
| 2018/0075111 A1* | 3/2018 | Bakir | G06F 16/951 |
| 2018/0101540 A1* | 4/2018 | Stoop | G06F 16/7867 |
| 2019/0286911 A1* | 9/2019 | Smith | G06K 9/4652 |

* cited by examiner

VIDEO CONTENT INDEXING AND SEARCHING

FIELD

This disclosure generally relates to digital fingerprinting. More specifically, aspects of the disclosure provide improved systems and methods of indexing and searching video content.

BACKGROUND

In the age of information, the ability to find relevant information is often more valued than the ability to simply amass and store a vast amount of information. A search engine is a valuable tool that allows one to pinpoint the location of information being sought. Compared to searching through text, the task of finding an image that is similar to another image can be significantly more complicated because an image may be altered and manipulated in a number of ways, such as altering hue, brightness, contrast, etc., without necessarily losing its visual identity. The visual information is also typically larger in size than its textual counterpart, which necessitates manipulation of a larger set of data when performing a comparison. Video content, which is essentially a collection of multiple still images, may pose an even greater challenge not only due to its increased data size but also due to the added complexity of temporal displacements.

The ability to accurately identify similar video content may be extremely valuable for content creators, content distributors, as well as consumers of video content. For example, a content creator or a rights holder may be interested in culling through a vast ocean of publicly available video content to quickly identify whether any of their intellectual properties have been stolen or misused. A content distributor such as an online video streaming service may want to make sure that none of the user-attributed content on their streaming service is illegitimate or inappropriate. Additionally, a consumer may encounter a short clip of a film that she liked and decide to locate the full movie to watch from the beginning.

However, existing solutions for video content search are often inefficient and costly in terms of computing resources being required. Conventional video searches may also be slow and inaccurate.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein relate to indexing and searching for video content.

According to various aspects of the disclosure, a system may receive one or more input videos to be indexed. For each frame of an input video, a global feature and one or more local features may be identified. These features may be referred to as direct features of the frame. Based on the direct features, indirect features of the frame may be also obtained. Specifically, the local features may be clustered around respective cluster centers, and the local features may be converted into binary signatures. Once the direct and indirect features are identified, an index may be generated to map the relationships among the cluster centers, the binary signatures, the video frames, etc.

The system may also receive a video search query associated with a query video. The direct and indirect features of the query video may be identified. These features may be compared against the information stored in the index and one or more candidate videos may be output as a search query result.

DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged," and similar terms, is meant to include both direct and indirect mounting, connecting, coupling, positioning and engaging.

Figure 1:
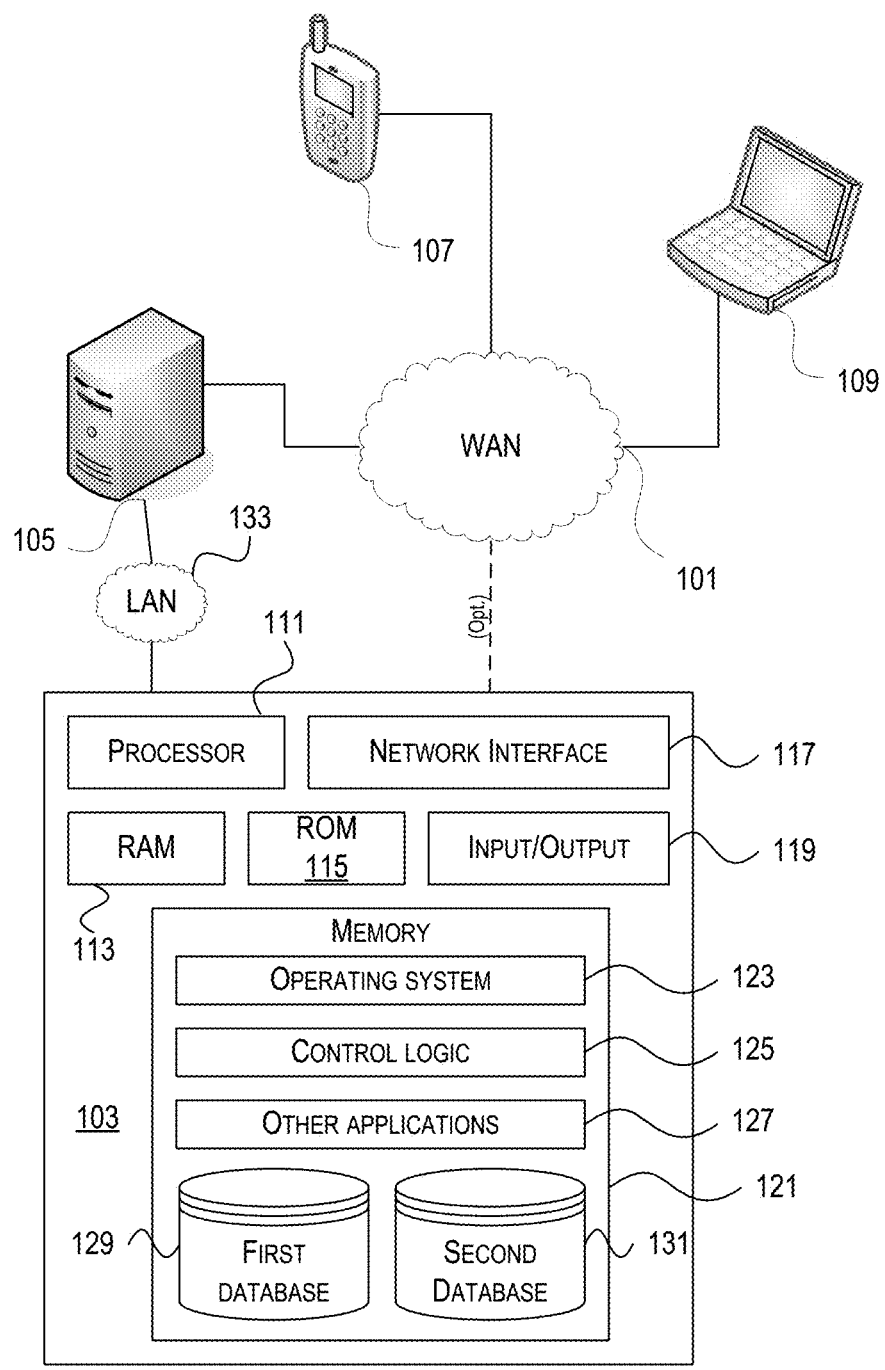
FIG. 1 depicts an illustrative computer system architecture that may be used in accordance with one or more illustrative aspects described herein.

Computer software, hardware, and networks may be utilized in a variety of different system environments, including standalone, networked, remote-access (also referred to as "remote desktop"), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include server 103, web server 105, and client computers 107, 109. Server 103 provides overall access, control and administration of databases and control software for performing one or more illustrative aspects describe herein. Server 103 may be connected to web server 105 through which users interact with and obtain data as requested. Alternatively, server 103 may act as a web server itself and be directly connected to the Internet. Server 103 may be connected to web server 105 through the local area network 133, the wide area network 101 (e.g., the Internet), via direct or indirect connection, or via some other network. Users may interact with the server 103 using remote computers 107, 109, e.g., using a web browser to connect to the server 103 via one or more externally exposed web sites hosted by web server 105. Client computers 107, 109 may be used in concert with server 103 to access data stored therein, or may be used for other purposes. For example, from client device 107 a user may access web server 105 using an Internet browser, as is known in the art, or by executing a software application that communicates with web server 105 and/or server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and server 103 may be combined on a single server.

Each component 103, 105, 107, 109 may be any type of known computer, server, or data processing device, such as a personal computer (PC), a laptop computer, a desktop computer, a mobile device, a smartphone, a tablet computer, a wearable computing device, a heads-up display (HUD), an embedded computer, etc. Server 103, e.g., may include a processor 111 controlling overall operation of the server 103. Server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing server 103 to perform aspects described herein, and other application software 127 providing secondary, support, and/or other functionality which may or might not be used in conjunction with aspects described herein. The control logic 125 may also be referred to herein as the server software 125. Functionality of the server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. The first database 129 and/or the second database 131 may store, for example, an index that maps various features (e.g., global features, local features, cluster centers, etc.) to video content items. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, compact disc read-only memories (CD-ROMs), optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
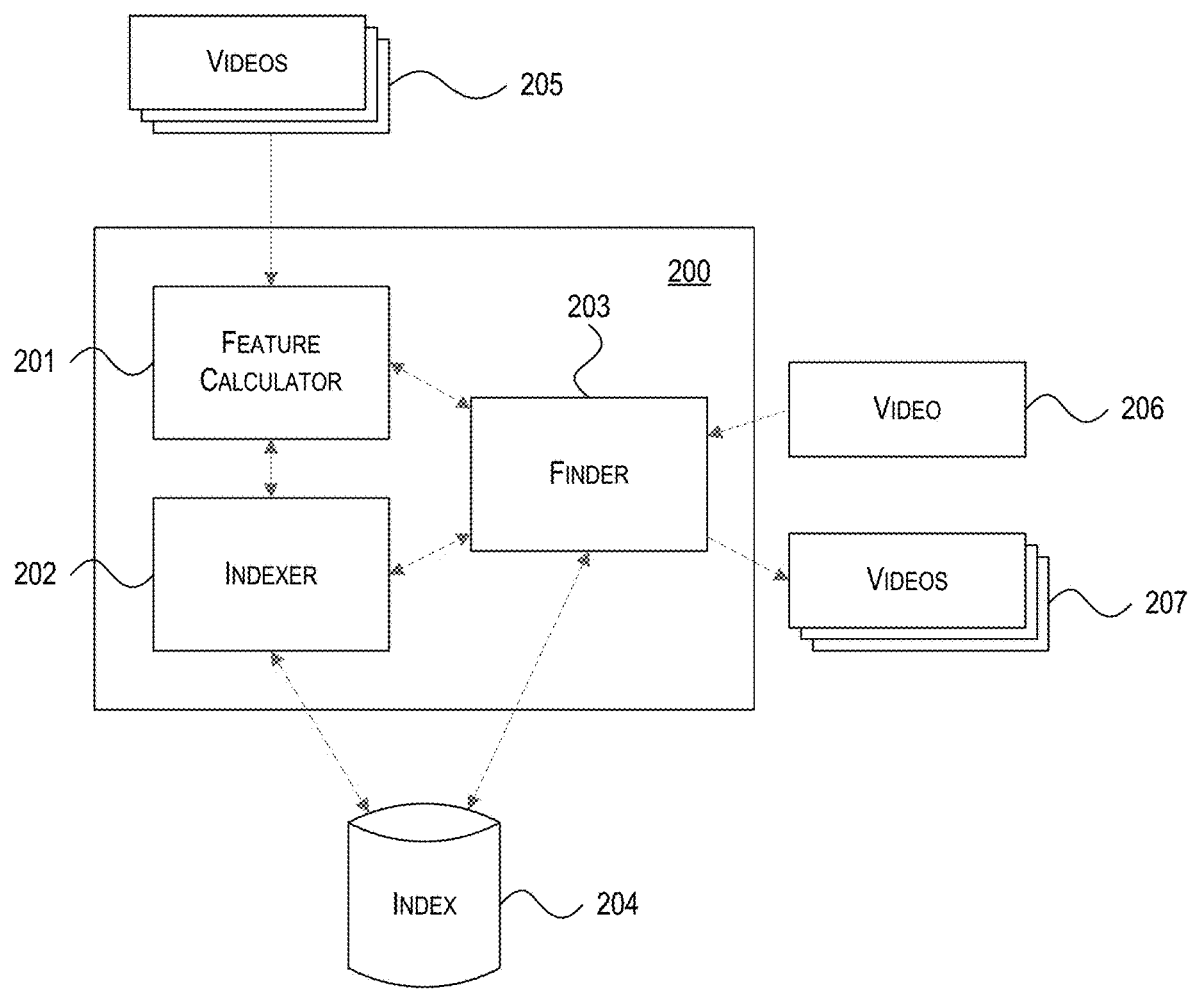
FIG. 2 depicts an illustrative system architecture that may be used to extract features from one or more video content items, generate an index, and find a candidate video in response to a query.

FIG. 2 depicts an illustrative system architecture that may be used to extract features from one or more video content items, generate an index, and find a candidate video in response to a query. In particular, the system 200 may include a feature calculator 201, an indexer 202, and a finder 203. Although the system 200 may be part of any one of the devices shown in FIG. 1, such as the server 103, the web server 105, and the mobile device 107, and the computer 109, it will be assumed that the system 200 is part of the server 103 in the present disclosure for illustrative purposes. The feature calculator 201, the indexer 202, and the finder 203 may be implemented as software, hardware, or a combination of both. For example, one or more of these components may reside inside the RAM 113, the ROM 115, or the memory 121 as part of the operating system 123, the control logic 125, and/or the other applications 127. Additionally or alternatively, one or more of the feature calculator 201, the indexer 202, and the finder 203 may be implemented as a separate hardware module (e.g., a processor, a logic circuit, etc.) in the server 103. The index 204 may refer to any storage medium or the data structure to be stored in such storage medium. For example, the index 204 may be part of the first database 129 or the second database 131. Specifically, the index 204 may store mapping information for various features and video content.

The system 200 may receive one or more video content items 205 as an input. The videos 205 may be digital representations of video content such as a movie, a film, television programming, a recorded video clip, etc. The videos 205 may be a file, a stream, a collection of video signals, etc. The videos 205 may be encoded using one of the widely available codecs such as MPEG-4, H.264, H.265, etc., or it may not be encoded. The videos 205 are a set of videos on which a search may be conducted. The feature calculator 201 may receive the videos 205 and extract various features, such as global features and local features, from one or more video frames of the videos 205. The indexer may further process the extracted features, and then generate or update the index 204 by mapping various features to the videos 205 such that a faster and more efficient video search may be performed at a later time using the index 204. The index 204 may also store the videos 205 themselves, or alternatively the videos 205 may be stored at a location separate from the index 204.

Once the index 204 is created and maintained by the indexer 202, the finder 203 may receive a video search query associated with an input video such as a video 206. The video 206 may be a search query video. Specifically, the video search query may be a request to find one or more video content items indexed in the index 204 that are identical or similar to the video 206. The video search query may be received from another device such as the web server 105, or from a user device such as the mobile device 107 or the computer 109. For example, a user may submit a search query associated with a video clip of a particular film in order to find out whether any videos that are uploaded to a popular video-sharing website, such as YouTube® of San Bruno, Calif., are identical or similar to the submitted video clip.

The finder 203 may process the submitted video 206 and use the information stored in the index 204 to locate one or more likely search candidate videos 207. The candidate videos 207 may be one or more videos that the finder 203 has determined to be similar (i.e., satisfying a predetermined threshold) to the submitted video 206. The candidate videos 207 may be further ranked according to their likeness or similarity to the submitted video 206. Once the candidate videos 207 are selected and/or ranked, the videos 207 or information pertaining to the videos 207 may be returned to the submitter of the video search query (e.g., the devices 105, 107, 109) as a search result.

Figure 3:
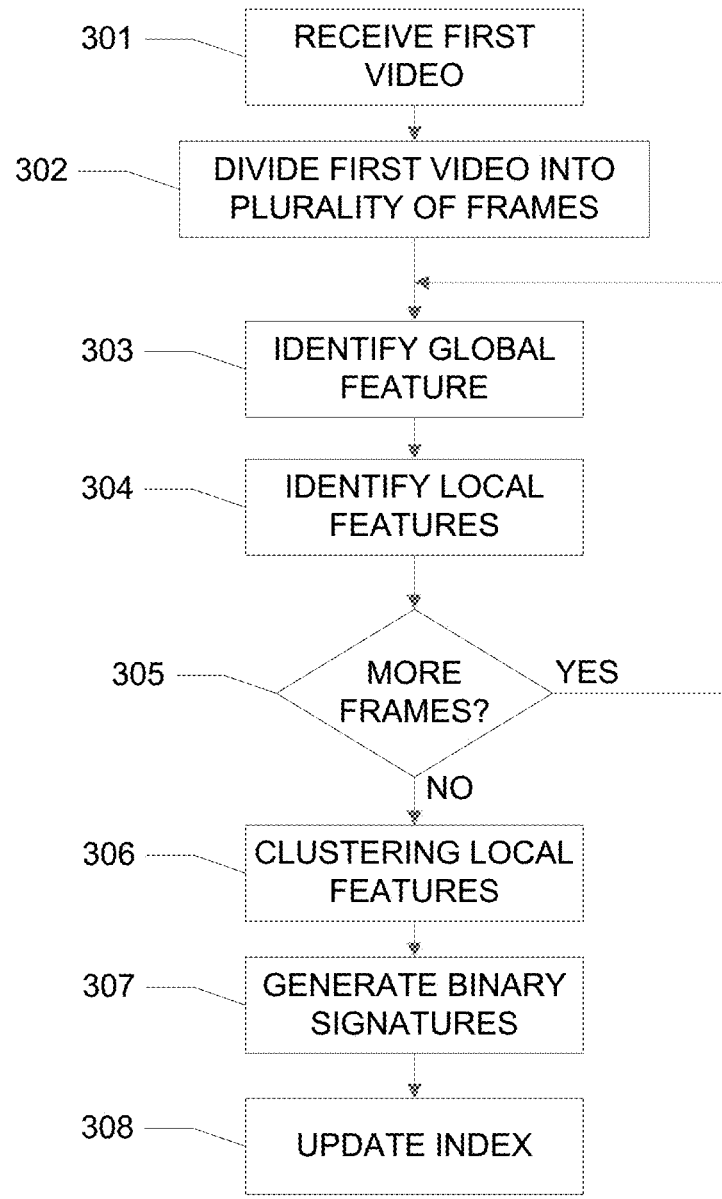
FIG. 3 depicts an illustrative flow diagram for extracting features from a video and generating an index.
Figure 4:
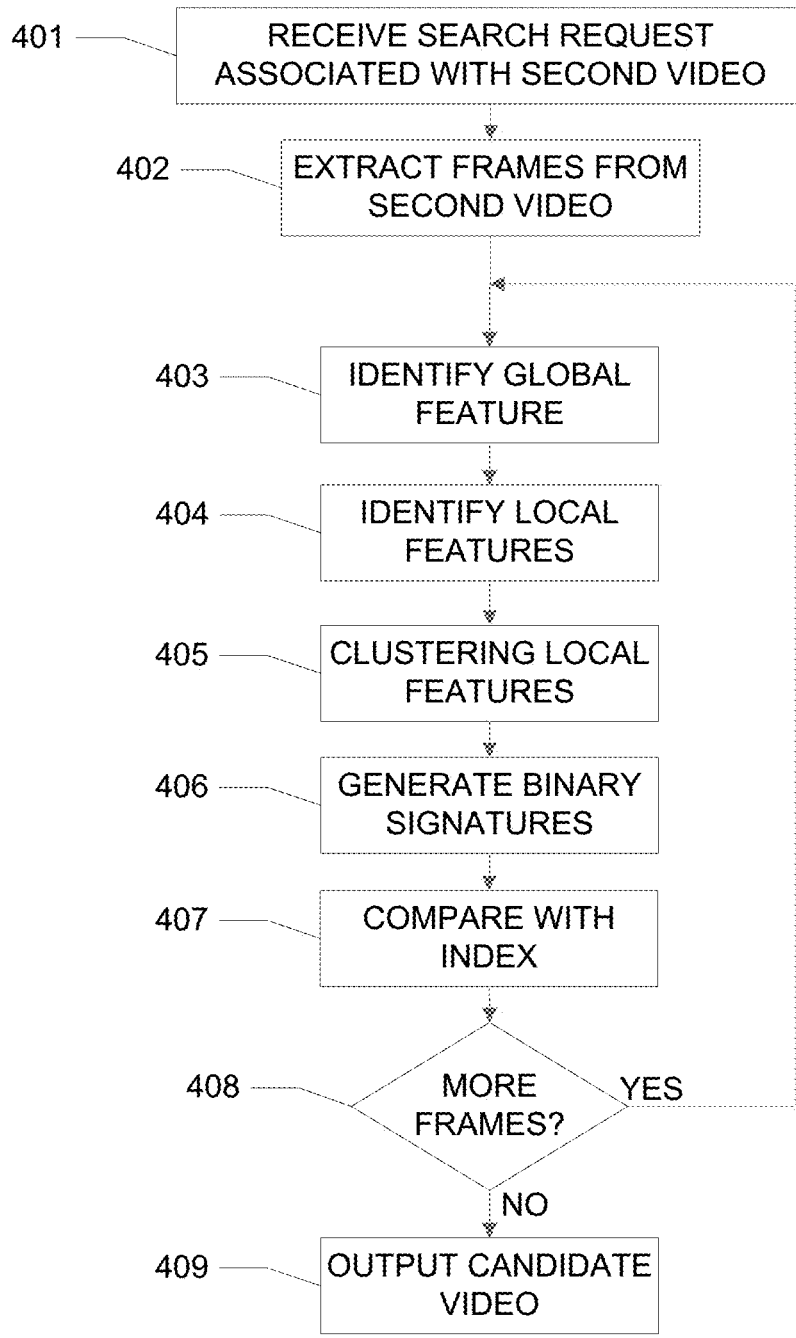
FIG. 4 depicts an illustrative flow diagram for finding a match candidate video.

Having disclosed some basic system components and concepts, the disclosure now turns to the example method embodiments shown in FIGS. 3-4. For the sake of clarity, the methods are described in terms of the example system 200 as shown in FIG. 2 configured to practice the methods. Additionally, one or more network nodes shown in FIG. 1, including the server 103, the web server 105, the mobile device 107, and the computer 109, can also perform any of the steps disclosed herein. The steps outlined herein are exemplary and can be implemented in any combination thereof, including combinations that exclude, add, or modify certain steps.

FIG. 3 depicts an illustrative flow diagram for extracting features from a video and generating an index. The system 200 (e.g., the feature calculator 201) may receive a first video (301). The first video may be an input video to be index and may consist of multiple videos. The first video may be received from another device. The first video may be received via a network connection, such as the Internet. The first video may be decoded using a codec for further processing. The first video may be divided into a plurality of frames for further processing (302). A frame of a video refers to a single still image that makes up the moving picture represented in the video. For example, a video clip may have 30 frames per second, each of the frames corresponding to a single still image that represents ⅟₃₀ of a second in time.

Not all frames may be extracted and used in later steps of the method, however, and some frames may be discarded for the purpose of creating the index 204. For example, only those frames that significantly (e.g., above a threshold) differ from a reference frame may be extracted. The difference may be determined in terms of color histogram (e.g., YUV or RGB). For example, YUV is a color encoding system that utilizes brightness components (Y) and chrominance components (U). Frames may differ from each other if the distance or difference between their respective histograms is greater than a threshold value. The distance between histograms may be defined in various ways. In some embodiments, the distance may be defined as the sum of absolute differences of histogram values. The reference frame may be the first frame of the video or the first frame of a given set of frames in the video. The reference frame may be a key frame. Other frames, whose histograms that are determined to be too similar to the histogram of the reference, may be discarded. For example, in an embodiment, the histogram of the first frame of the first video may be used as the reference frame. Then, the histograms the subsequent frames may be obtained and compared against the reference frame. Based on the comparison, any similar frames may be dropped until a frame is encountered that differs significantly enough (e.g., above a threshold) from the current reference frame. After that, this different frame may be designated as the new reference frame and its histogram may be used as a reference for the subsequent frames. These steps may be repeated as necessary, and any adjacent frames that are left undropped would be guaranteed to be different from each other.

While the frames are being extracted, one or more filters may be used to suppress the signal noise on a frame-by-frame basis. For example, the filters may include a Gaussian blur filter. In some embodiments, connected areas of pixels around the edges of a frame may be also rejected when the overall brightness of such edge areas is lower than a threshold. For example, black (or near black) image borders may be cropped in this manner because they do not necessarily contain valuable information.

Once the necessary frames are extracted from the first video, the system 200 (e.g., the frame calculator 201) may identify one or more global features for each frame of the extracted frames (303). A global feature (denoted "V") may refer to a vector of certain number (e.g., 64) of values (also referred to as "global descriptors") that characterizes a frame as a whole. Calculation of a global feature may be performed by using a deep neural network such as the convoluted neural network (CNN). The neural network may be trained in such way that the distance, in a particular metric space, between global features of two frames in the video represents the visual similarity between those two frames. In other words, similar frames may have a smaller distance between their global features. For example, the neural network used herein may be a modified version of AlexNet or GoogLeNet. Specifically, the GoogLeNet architecture may be modified by removing the last "inception" block of layers, removing the last "softmax" layer, and adding one more fully connected layer in the end. The vector of the global feature may be obtained from an output of the last layer of such a neural network.

When training the neural network, a problem of unconstrained optimization may be solved in order to improve the efficiency of calculating a feature. In particular, a definition of a mistake, which is required to train a neural network, may be created and functionality may be written under triplets, which will be minimized. The triplets refer to a set of three images: an anchor (original) image, a positive image (similar to the original image but distorted), and a negative (dissimilar) image, and the mistake refers to the distance between the global descriptors of the original image and the global descriptors of the similar image, which is ideally small, minus the distance between the global descriptors of the original image and the global descriptors of the dissimilar image, which is ideally large. Thus, ideally this mistake should be minimized on a set of image triplets. As such, the neural network may be trained in such a way that a distance between global descriptors of some images represents those images' similarity. In other words, similar images would have a smaller distance between their respective descriptors.

A neural network or a set of neural networks may be chosen such that they satisfy previously chosen data in terms of quality of global descriptors that are being calculated. The triplets may be created from frames of the first video, on which a search will be based. The criteria for determining the quality of global descriptors may be one or more of the following: a distance between descriptors of similar frames being less than a threshold, and a distance between descriptors of dissimilar frames being greater than a threshold. Once one or both of these criteria are satisfied on a set of frame triples, the appropriate neural networks may be chosen to calculate global descriptors.

The system 200 (e.g., the frame calculator 201) may identify one or more local features for each frame of the extracted frames (304). A local feature may refer to a vector representation of a local neighborhood in a given frame of image. Unlike a global feature that describes the entire frame, the local feature may represent only a portion of the frame and thus each frame may contain more than one local feature corresponding to multiple locations (also referred to as "spots" or "key points") within the frame. A local feature may be represented by local descriptors, such as a key point (denoted "$p_i$"), a color feature ($u_i$), and a gradient ($w_i$), although other local descriptors may also be used to describe a local feature. A key point ($p_i$) may be represented by its location coordinates, radius, orientation, angle, etc. A key point $p_i$ of the local feature may be accompanied by its color characteristic descriptor $u_i$, which is a histogram describing color distribution in the neighborhood of the spot, and its descriptor $w_i$, which describes the conduct of the gradient in the neighborhood of the spot. Thus, each frame I of the extracted frames may correspond to a set of descriptors as follows: F: I→{V, $p_i$, $u_i$, $w_i$}. As noted above, Frame I may correspond to a number (N) of sets of local descriptors such that: F: I→{V, $p_1$, $u_1$, $w_1$, $p_2$, $u_2$, $w_2$, . . . , $p_N$, $u_N$, $w_N$}. In other words, N may represent the number of local features in the frame.

The global descriptors (V) and the local descriptors ($p_i$, $u_i$, $w_i$) are referred to as primary features (also referred to as "direct features") of the frame, and the primary features may be supplemented by additional features (also referred to as "secondary features" or "indirect features") upon the search request, as will be discussed in further detail below. Some examples of the global descriptor V include the following:

float global_descriptor[64]={0.840188, 0.394383, 0.783-099, 0.798440, 0.911647, 0.197551, 0.335223, 0.768230, 0.277775, 0.553970, . . . }//64 values int64 global_descriptor_binary; //{1, 0, 1, 1, 1, 0, 0, 1, 0, 1 . . . }//64 values std::bitset<64> global_descriptor_binary; //{1, 0, 1, 1, 1, 0, 0, 1, 0, 1 . . . }//64 values Further, an example data structure for a spot or key point ($p_i$) and a vector of key points may be represented as follows:

typedef struct key_point {float coordinate_x; float coordinate_y; float orientation_angle; float radius;};

std::vector<key_point> keypoints;

An example data structure $u_i$ describing color distribution in the neighborhood of a spot may be represented as follows:

std::vector<Matrix<histogram_value_type, M, R>> color_descriptors;

In the example above, M may represent the number of segments, and R may represent the dimension. For example, M may be 3 or 4, while R may be 1 or 3, and histogram_value_type may be of a "float" type.

An example data structure $v_i$ describing the conduct of the gradient in the neighborhood of the spot may be represented as follows:

std::vector<std::vector<float>> local_descriptors;

An example data structure for a local descriptor (where L is the size of the local descriptor, e.g., 64) may be represented as follows:

std::vector<float> local_descriptors(L) //{0.234, −0.123, . . . }//64 floating point numbers An example data structure for indirect features (where SIGNATURE_SIZE may be, for example, 32) may be represented as follows:

std::vector<std::uint64_t> cluster_ids; //identifiers for clusters to which features belong std::vector<std::bitset<SIGNATURE_SIZE>> signatures; // binary signatures Primary features may depend on the input image only, while the secondary features may be calculated based on both primary features and characteristics of a database of video/image content (e.g., index 204). In other words, secondary features may depend on a query image and a database of video/images, in which candidates are searched for a match. The primary and/or secondary features of a given frame of image may represent a digital fingerprint (i.e., a frame fingerprint) that uniquely defines the frame, and these features, along with information about positions of appropriate frames in the source video, may collectively be referred to as a video feature (i.e., a video fingerprint) of that video. At operation 305, it is determined whether there are more frames to be processed. If there are more extracted frames left, then the process returns to operation 303. Otherwise, the process continues to operation 306.

In order to support search on a previously provided set of videos, it is necessary to create one or more structures (referred to as "an index") of a specific type, in accordance with features that have been calculated for this set. This process, referred to as indexing, will allow fast access to similar videos in terms of features. An index may be a hybrid structure created based on locality-sensitive hashing and/or clustering over the range of vectors from the global features. The hybrid structure may be a combination of a randomized k-d tree and a hierarchical k-means tree. The hybrid structure may store supplemental information that allows for fast search on a range of multidimensional vectors. The hybrid structure may be created using, for example, the CompositeIndex algorithm from OpenCV/FLANN libraries, where FLANN stands for Fast Library for Approximate Nearest Neighbors.

As part of generating an index entry, the system 200 may cluster over a range of vectors by grouping vectors by their similarity. In particular, the system 200 (e.g., the indexer 202) may cluster the local features of the first video (306). Thus, vectors (i.e., descriptors) from the same group (i.e., cluster) would be more similar to each other than to those vectors in other groups or clusters. Similarity is measured by the distance between vectors, and similar elements have a smaller distance between them. Organizing the feature data (e.g., descriptors) into clusters may speed up the search, and thus increase the efficiency of the system 200 itself. For instance, the local features may be quantized by mapping these local features to centers of clusters that they belong to. Similar local features may be grouped together. The indexer 202 may have a parameter that determines the maximum number of features that may be grouped together as a single cluster, and this parameter may be set experimentally. In one embodiment, a subset of all local features may clustered using the k-nearest neighbors (KNN) algorithm and centers of those clusters may be found. Then each cluster may be subclustered to have a specified number of features in each cluster and again find centers of the new clusters. After that, an appropriate cluster number may be assigned to each local feature according to its corresponding cluster center. A cluster center may be a coordinate-wise mean of vectors of the corresponding cluster. Thus, the index may be thought of as a corpus of documents, where the documents represent the frames and the cluster centers are represented by words in those documents. Each document or frame may contain a certain number of words or local features, and each local feature in the document may be marked with an appropriate cluster number it belongs to.

The system 200 (e.g., the indexer 202) may generate binary signatures (307). Specifically, in accordance with the cluster centers obtained as previously discussed, local descriptors may be reflected into binary signatures. A binary signature may be a short-hand representation (e.g., locality-sensitive hash) of the position of a local feature relative to its corresponding cluster center. For example, the descriptors before the conversion may be a relatively large set of numbers (e.g., 64 14-point numbers or 64 single-precision floating point numbers (32 bit each), i.e., 2048 bits total), while the binary signatures, once converted, may be a relatively smaller set of numbers (e.g., 32-bit binary representation). As a result, the binary signature may allow a more precise comparison of local features belonging to the same cluster.

In some embodiments, first, descriptors of local features belonging to a cluster center may be projected onto descriptors of a smaller dimension. This may be performed by multiplying the local descriptors by a projection matrix. Then a median projected descriptor may be identified for each cluster by selecting median values of the projected descriptor values for each coordinate. Thus, the binary signature of descriptors may be coordinate-wise binarization of vector difference between projected descriptors and the median projected descriptor. For example, negative value of a coordinate of difference vector may be encoded as 0, while a zero value or positive value may be encoded as 1. An example data structure for a binary signature may be represented as follows:

std::bitset<32> signature; //{0, 1, 1, 0, 0, 1, 0, 1, 1, . . . , 1}
   32 values total Upon creation of the aforementioned supplemental structures and the list of correspondence between the index documents and the videos, the system 200 updates the index based on this information (308). The index, for example, may be a set of documents (e.g., video or video frames) mapped to their features. Each document (e.g., frame) in the index may contain a global feature, local features, and indirect features associated with the corresponding frame. For example, an example data structure for an index may be represented as follows:

std::map<document_id_type, document_type> index;

In the example data structure illustrated above, document_id_type may represent a type of document identifier and it can be of "int64" type. In addition, document_type may represent a structure containing global, local, and indirect features as described above. In other words, index may be a key-to-value map structure, where key is the frame ID, and value is frame data with features and descriptors.

The index may be an inverted index, in which a word (e.g., cluster center and/or local features) is mapped to a document (e.g., video frame), to allow faster search. Thus, a range of data structures may be created in order to provide faster access to the requested data (e.g., indexed videos). Inverted index, for example, may also be a key-to-value map structure, where key is the ID of a cluster, and value is a set of IDs of documents (e.g., frames) that contain features belonging to the corresponding cluster. For example, in the example data structure for an inverted index below, inverted_index[cluster_id] may retrieve a list of documents (e.g., frames) that contain features belonging to the cluster "cluster_id":

std::map<cluster_id_type, std::vector<document_id_type>>
   inverted index;

FIG. 4 depicts an illustrative flow diagram for finding a match candidate video. The system 200 (e.g., the finder 203) may receive a video search request associated with a second video (401). The second video may be a search query video (e.g., video 206) to be compared against the previously indexed videos (e.g., videos 205). The second video may be further decoded using a codec and/or filtered. The system 200 (e.g., the finder 203) may then extract at least one frame from the second video (402). The extracted frame may be key frames.

The system 200 (e.g., the finder 203) may extract direct features from the second video. In particular, the system 200 may identify one or more global features (403) and identify one or more local features (404) based on the extracted frames. The system 200 may further generate indirect features (e.g., cluster centers and binary signatures) based on the direct features. In particular, the system 200 may cluster local features by identifying one or more cluster centers (405). When clustering is performed to add a set of local features of one or more videos to an index, as when the local features are clustered in step 306 of FIG. 3, clusters may need to be defined (i.e., select the number of clusters, select cluster centers, distribute local features among clusters, etc.). However, in operation 405 for query videos, the local features may be distributed among the clusters predefined in the index (i.e., each feature is assigned to one of the existing clusters). The clustered local features may be used in a bag-of-words model. For each key frame, the system 200 may generate binary signatures (406). Generating the binary signatures may be done in a similar fashion as the generation of binary signatures in operation 307 of FIG. 3.

Once the direct and indirect features of the second video are generated, the system 200 (e.g., the finder 203) may compare these features with the index (407) to identify any video search candidates that are similar to the second video. Specifically, possible candidates for similarity are chosen in accordance with the frame of the requested video (i.e., second video) with the use of the nearest neighbor search. The index structures created according to the description above would allow fast performance of this task.

From the index, video candidates whose features' distance from the query frame is less than a specified threshold are identified, and the best N candidates are selected from them, where N is a natural number. In some embodiments, the comparison of the global descriptors may be conducted first, and then only if close enough (e.g., above a threshold) result is found with the global descriptors, may a subsequent and more precise search using other methods, such as comparison of local features, be performed. The selected candidates may be further ranked in order of relevance. For example, a comparison of features may be performed using the Okapi BM25 formula, which is a ranking function for ranking matching documents according to their relevance to a given search query. The binary signatures may be used to compare similar words (e.g., local features/descriptors) belonging to the same cluster. In particular, if local features belong to the same cluster (i.e. mapped to the same cluster center), binary signatures may be used for more precise comparison of these features.

The ranking may further involve different types of measurements, such as geometric transformation and color information. For evaluating geometric transformation, it may be determined how many key points from the query image (i.e., a frame from the second video) can be mapped to key points of a candidate image using a projective transformation algorithm such as homography. The color information describes color distribution in the neighborhood of a spot, and the key points found during geometric transformation estimation may be used to check whether color distributions around certain key points are similar. Various measurements for ranking as explained above, such as Okapi BM25, binary signatures, geometric transformation, and color information, may be used individually or in combination. An output of each measurement may be a score that represents similarity, and scores from each measurement are compared with respective thresholds, such that each measurement may approve or reject a candidate based on the score. If all the measurements approve a candidate, the score of the candidate may be calculated as a weighted sum. The weighting coefficients may be predefined (e.g., set by a user), and these values may be determined by experiment. Any unfit (i.e., failing to satisfy a threshold) candidates may be removed.

Temporal displacements in relation to the requested frame (e.g., a key frame of the second video) and the remaining frames from the index may be obtained. The temporal displacement (also referred to as "a time shift") refers to difference in time position between the candidate frame in the candidate video and the query frame in the query video. The displacements may be quantized, and the candidate frames from the same source (e.g., a video from the index) may correspond to a histogram cell. In other words, possible values of displacement may be constrained to a smaller discrete set. For example, quantization of temporal displacement may be performed as rounding of a displacement to its nearest value, which is a multiple of a quantization step. As a further example, if the displacement is measured in seconds and the quantization step is 10 second, quantization may be rounding to the nearest multiple of 10 seconds. The histogram cell (also referred to as "a histogram bin" or "a histogram mesh") may contain a set of frames of a video from the index that have the same temporal displacement (time shift) relative to the matching query frames of the query video.

Operations 403, 404, 405, 406, and 407 may be repeated (either serially or in parallel) for each extracted frame (e.g., key frame) of the second video. Thus, if there are more frames to process (405), then the process may return to operation 403. Otherwise, the process may continue on to process 409.

The system 200 (e.g., the finder 203) may output one or more candidate videos (409). In order to do this, each histogram cell corresponding to a set of frames from the same video from the index and the total vote (referred to as "assumption") may be identified. The total vote may be a summary score for each histogram cell. In other words, the total vote may be a weighted sum of scores of the aforementioned ranking measurements. The assumption may be a combination of the total vote and the content of corresponding histogram cell. In other words, an assumption may be a set of frames from a certain video from the index, which stores an identifier of this video, and the total vote (or summary score), which is a measure of similarity. The assumptions may be ordered in the decreasing order of votes and provided as a result of the search query. The output may include, for example, a list of links to video files, a list of names of the videos, a list of frames from the video files, etc. The search result may be any subset of the assumptions data. For example, the result may be a set of identifiers of video files from the index (e.g., filenames, links, etc.) having summary scores greater than a threshold. Thus, the search result would represent a video or a set of videos that are the most probable near-duplicates of video files from the index.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A method comprising:
   for each frame of a first plurality of frames in a first video, identifying:
      a first global feature, and
      a first plurality of local features;
   clustering, based on a similarity between a plurality of vectors in the first plurality of local features, the first plurality of local features around a first plurality of cluster centers;
   converting, based on the first plurality of cluster centers, the first plurality of local features into a first plurality of binary signatures;
   generating an index that maps the first plurality of cluster centers and the first plurality of binary signatures to the first plurality of frames;
   receiving a search request associated with a second video;
   identifying, for a frame in the second video, a second global feature and a second plurality of local features;
   identifying, for the frame in the second video and based on the second plurality of local features, a second plurality of cluster centers;
   converting, for the frame in the second video and based on the second plurality of cluster centers, the second plurality of local features into a second plurality of binary signatures; and
   selecting, from the index and based on the second plurality of cluster centers and the second plurality of binary signatures, a candidate video.

2. The method of claim 1, further comprising, prior to identifying the first global feature and the first plurality of local features for each frame of the first plurality of frames in the first video:
   receiving the first video;
   decoding the first video; and
   dividing the first video into the first plurality of frames.

3. The method of claim 2, wherein dividing the first video into the first plurality of frames comprises discarding at least one frame from the first plurality of frames, wherein a first color histogram corresponding to the at least one frame is different from a second color histogram corresponding to a reference frame of the first plurality of frames by at least a threshold value.

4. The method of claim 2, wherein dividing the first video into the first plurality of frames comprises applying a filter to the first plurality of frames to suppress noise.

5. The method of claim 4, wherein the filter comprises at least a Gaussian blur filter.

6. The method of claim 4, wherein the dividing the first video into the first plurality of frames comprises rejecting an edge area of a frame in the first plurality of frames, wherein the edge area has a brightness value below a threshold.

7. The method of claim 1, wherein the first global feature, for each frame of the first plurality of frames in the first video, is identified by using a convoluted neural network.

8. The method of claim 1, wherein the first global feature comprises vectors that uniquely identify each frame of the first plurality of frames in the first video.

9. The method of claim 1, wherein the first plurality of local features comprise at least a color feature or a gradient.

10. The method of claim 1, wherein each of the first plurality of local features corresponds to a respective coordinate location in a corresponding frame of the first plurality of frames.

11. The method of claim 1, wherein the index comprises a hybrid structure based on at least two of locality-sensitive hashing, a randomized k-d tree, or a hierarchical k-means tree.

12. The method of claim 1, wherein clustering the first plurality of local features around the first plurality of cluster centers comprises:
   identifying, among the first plurality of local features, a subset of local features having descriptors that are proximate to each other above a threshold, and
   identifying a cluster center that is a coordinate-wise mean of the descriptors of the subset of local features.

13. The method of claim 1, wherein converting the first plurality of local features into the first plurality of binary signatures comprises:
   projecting first descriptors of the first plurality of local features onto second descriptors by using a projection matrix, wherein each of the second descriptors has a smaller dimension than a corresponding descriptor of the first descriptors,
   selecting a median value of the second descriptors, and
   performing coordinate-wise binarization of a vector difference between the second descriptors and the median value.

14. The method of claim 1, wherein each of the first plurality of binary signatures comprises a locality-sensitive hash of a position of a corresponding local feature, relative to a corresponding cluster center of the first plurality of cluster centers.

15. The method of claim 1, wherein the candidate video is selected further based on the second plurality of local features.

16. The method of claim 1, wherein the second plurality of cluster centers are identified for a use in a bag-of-words model.

17. The method of claim 1, wherein selecting the candidate video comprises:
   identifying, from the index and based on the second plurality of cluster centers and the second plurality of binary signatures, a plurality of candidate videos for the frame in the second video;
   ranking the plurality of candidate videos in relation to the frame in the second video;
   removing, from the plurality of candidate videos, at least one candidate video that does not satisfy a threshold condition;
   assigning votes to the plurality of candidate videos based on histogram cells associated with the plurality of candidate videos in relation to the frame of the second video; and
   selecting, among the plurality of candidate videos, a candidate video that has a highest vote.

18. The method of claim 17, wherein the plurality of candidate videos are identified using a nearest neighbor search.

19. A system comprising:
   a processor; and
   memory storing instructions which, when executed by the processor, cause the system to perform operations comprising:

for each frame of a first plurality of frames in a first video, identifying:
  a first global feature, and
  a first plurality of local features;
clustering, based on a similarity between a plurality of vectors in the first plurality of local features, the first plurality of local features around a first plurality of cluster centers;
converting, based on the first plurality of cluster centers, the first plurality of local features and into a first plurality of binary signatures;
generating an index that maps the first plurality of cluster centers and the first plurality of binary signatures to the first plurality of frames;
receiving a search request associated with a second video;
identifying, for a frame in the second video, identifying a second global feature and a second plurality of local features;
identifying, for the frame in the second video and based on the second plurality of local features, a second plurality of cluster centers;
converting, for the frame in the second video and based on the second plurality of cluster centers, the second plurality of local features into a second plurality of binary signatures; and
selecting, from the index and based on the second plurality of cluster centers and the second plurality of binary signatures, a candidate video.

20. A non-transitory computer-readable storage medium storing instructions which, when executed by a processor, cause the processor to perform operations comprising:
for each frame of a first plurality of frames in a first video, identifying:
  a first global feature, and
  a first plurality of local features;
clustering, based on a similarity between a plurality of vectors in the first plurality of local features, the first plurality of local features around a first plurality of cluster centers;
converting, based on the first plurality of cluster centers, the first plurality of local features and into a first plurality of binary signatures;
generating an index that maps the first plurality of cluster centers and the first plurality of binary signatures to the first plurality of frames;
receiving a search request associated with a second video;
identifying, for a frame in the second video, identifying a second global feature and a second plurality of local features;
identifying, for the frame in the second video and based on the second plurality of local features, a second plurality of cluster centers;
converting, for the frame in the second video and based on the second plurality of cluster centers, the second plurality of local features into a second plurality of binary signatures; and
selecting, from the index and based on the second plurality of cluster centers and the second plurality of binary signatures, a candidate video.

\* \* \* \* \*